(12) United States Patent
Bae

(10) Patent No.: US 11,153,470 B1
(45) Date of Patent: Oct. 19, 2021

(54) CAMERA MODULE MANUFACTURING APPARATUS

(71) Applicant: Furonteer Inc., Seongnam-si (KR)

(72) Inventor: Sang Shin Bae, Seoul (KR)

(73) Assignee: Furonteer Inc., Seongnam-si (KR)

( * ) Notice: Subject to any disclaimer, the term of this patent is extended or adjusted under 35 U.S.C. 154(b) by 0 days.

(21) Appl. No.: 17/214,345

(22) Filed: Mar. 26, 2021

(30) Foreign Application Priority Data

May 8, 2020 (KR) ................ 10-2020-0055361

(51) Int. Cl.
*H04N 5/225* (2006.01)

(52) U.S. Cl.
CPC ......... *H04N 5/2254* (2013.01); *H04N 5/2252* (2013.01); *H04N 5/2253* (2013.01)

(58) Field of Classification Search
CPC .................................................. H04N 5/2254
USPC ........................................................ 348/335
See application file for complete search history.

(56) References Cited

U.S. PATENT DOCUMENTS

2020/0333618 A1* 10/2020 Yamaguchi ............ G02B 7/025

FOREIGN PATENT DOCUMENTS

| JP | 2005-292242 A | 10/2005 |
| KR | 2016-0051955 A | 5/2016 |
| KR | 2018-0046925 A | 5/2018 |

OTHER PUBLICATIONS

Non-Final Rejection dated Jul. 15, 2020 in Korean Patent Application No. 10-2020-0055361 filed May 8, 2020, 8 pages.
Written Decision on Registration dated Dec. 22, 2020 Korean Patent Application No. 10-2020-0055361 filed May 8, 2020, 7 pages.

* cited by examiner

*Primary Examiner* — Joel W Fosselman
(74) *Attorney, Agent, or Firm* — Kilpatrick Townsend & Stockton

(57) ABSTRACT

A camera module manufacturing apparatus includes: a chart unit configured to provide an image for optical-axis alignment to a substrate assembly including an image sensor; a substrate alignment unit disposed opposite to the chart unit, aligning the substrate assembly, and electrically connected to the image sensor; an optical axis alignment unit configured to allow an optical axis of a lens assembly including a lens and an actuator to be aligned with respect to an optical axis of the image sensor; and a camera module fixing unit positioned adjacent to the optical axis alignment unit, and fixing the lens assembly on the substrate assembly by applying an instantaneous curing adhesive, which is an inorganic material, to the lens assembly and the substrate assembly which are aligned.

6 Claims, 5 Drawing Sheets

CAMERA MODULE MANUFACTURING APPARATUS

CROSS-REFERENCE TO RELATED APPLICATION

This application is based on and claims priority under 35 U.S.C. § 119 to Korean Patent Application No. 10-2020-0055361, filed on May 8, 2020, in the Korean Intellectual Property Office, the disclosure of which is incorporated by reference herein in its entirety.

BACKGROUND

1. Field

Embodiments of the present disclosure relate to a camera module manufacturing apparatus.

2. Description of the Related Art

In the case of a camera module, especially a camera module mounted on a portable electronic device, as a number of pixels decreases due to a recent high resolution and miniaturization of mobile phones, a picture quality is greatly deteriorated even with a slight distortion of an optical axis.

In addition, in the case of vehicle camera modules, with the introduction of automatic parking function, lane detection function, and around view monitoring, a distance to an object, a size and shape of the object, a matching rate with a driver's field of view, and a degree of image alignment between cameras are becoming very important.

Therefore, when the camera module is assembled by coupling the lens assembly and the substrate having the image sensor, the camera module needs to be assembled to obtain optimal image characteristics.

SUMMARY

One or more embodiments include a camera module manufacturing apparatus, in which an optical axis of a lens and an optical axis of an image sensor are aligned when the camera module is assembled by using an instantaneous curing adhesive, and productivity is maximized.

Additional aspects will be set forth in part in the description which follows and, in part, will be apparent from the description, or may be learned by practice of the presented embodiments of the disclosure.

According to one or more embodiments, a camera module manufacturing apparatus includes: a chart unit configured to provide an image for optical-axis alignment to a substrate assembly including an image sensor; a substrate alignment unit disposed opposite to the chart unit, aligning the substrate assembly, and electrically connected to the image sensor; an optical axis alignment unit configured to allow an optical axis of a lens assembly including a lens and an actuator to be aligned with respect to an optical axis of the image sensor; and a camera module fixing unit positioned adjacent to the optical axis alignment unit, and fixing the lens assembly on the substrate assembly by applying an instantaneous curing adhesive, which is an inorganic material, to the lens assembly and the substrate assembly which are aligned.

In an embodiment of the present disclosure, the substrate assembly may further include a first extension part extending in a direction crossing the optical axis, and a first fixing part provided on one side of the first extension part and protruding from a surface of the first extension part.

In an embodiment of the present disclosure, the lens assembly may further include a second extension part formed corresponding to the first extension part and having a second hole formed to receive the first fixing part at one side thereof.

In an embodiment of the present disclosure, the camera module fixing unit may apply the instantaneous curing adhesive between the second hole of the lens assembly and the first fixing part of the substrate assembly so as to fix the lens assembly on the substrate assembly.

In an embodiment of the present disclosure, the camera module fixing unit may apply the instantaneous curing adhesive in a direction from the lens assembly to the substrate assembly so as to fix the lens assembly on the substrate assembly.

In an embodiment of the present disclosure, the adhesive may include solder.

Other aspects, features, and advantages other than those described above will become apparent from the following drawings, claims, and detailed description of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
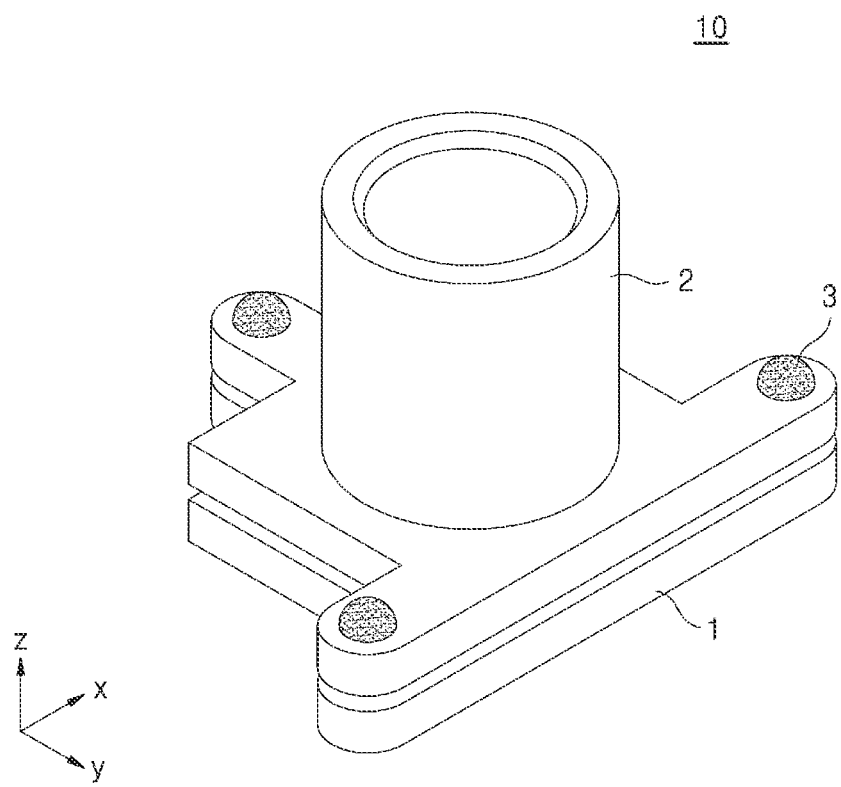
FIG. 1 is a perspective view illustrating an example of a camera module to be assembled by a camera module manufacturing apparatus according to an embodiment of the present disclosure.

Hereinafter, the following embodiments will be described in detail with reference to the accompanying drawings, and when describing with reference to the drawings, the same or corresponding constituent elements are denoted by the same reference numerals, and redundant descriptions thereof will be omitted.

Since the present embodiments can apply various transformations, specific embodiments will be illustrated in the drawings and described in detail in the detailed description. Effects and features of the present embodiments, and a method of achieving them will be apparent with reference to the contents described later in detail together with the drawings. However, the embodiments are not limited to the embodiments disclosed below and may be implemented in various forms.

In the following embodiments, terms such as first and second are used for the purpose of distinguishing one constituent element from other constituent elements rather than a limiting meaning.

In the following examples, expressions in the singular include plural expressions unless the context clearly indicates otherwise.

In the following embodiments, terms such as include or have means that the features or components described in the specification are present, and do not preclude the possibility that one or more other features or components may be added.

In the following embodiments, when a part, such as a unit, a region, or a component, is on or on another part, not only is it directly above the other part, but also another unit, region, component, etc. is interposed therebetween. Includes cases.

In the following examples, terms such as connect or combine do not necessarily mean direct and/or fixed connection or combination of two members, unless the context clearly indicates otherwise, and that another member is interposed between the two members. It is not to exclude.

It means that a feature or component described in the specification is present, and does not preclude the possibility that one or more other features or components may be added.

In the drawings, the size of components may be exaggerated or reduced for convenience of description. For example, the size and thickness of each component shown in the drawings are arbitrarily shown for convenience of description, and thus the following embodiments are not necessarily limited to those shown.

Figure 2:
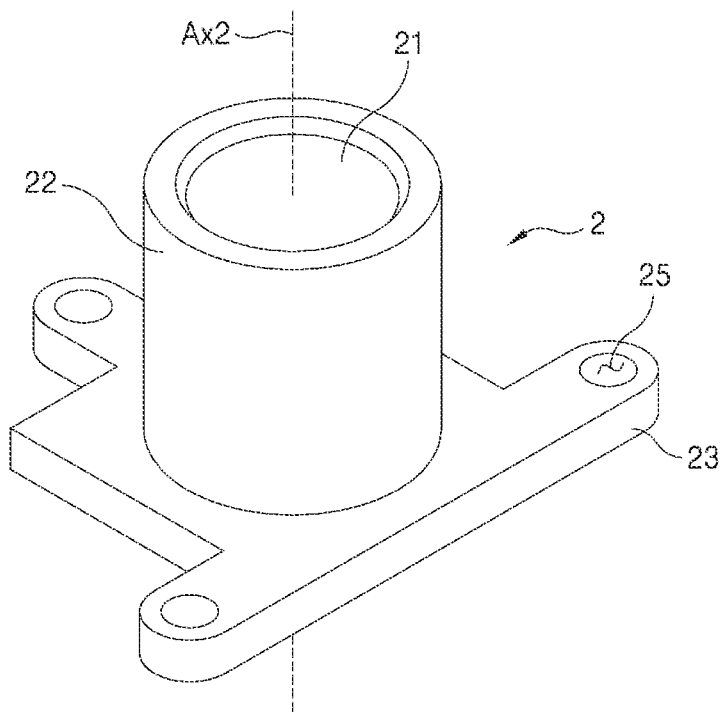
FIG. 2 is an exploded perspective view of FIG. 1.
Figure 2:
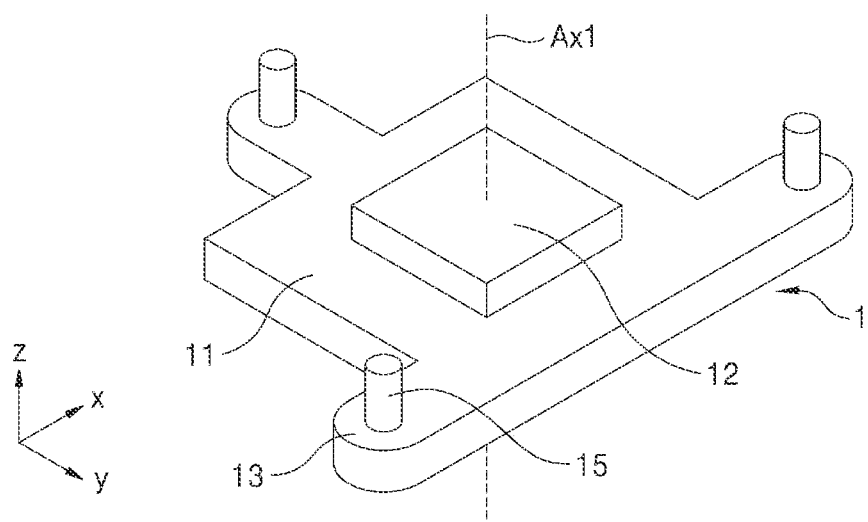

FIG. 1 is a perspective view illustrating an example of a camera module 10 to be assembled by a camera module manufacturing apparatus according to an embodiment of the present disclosure, and FIG. 2 is an exploded perspective view of FIG. 1.

Referring to FIGS. 1 and 2, an example of the camera module 10 may be a mobile, PC, and/or a camera module for a vehicle, and may include a substrate assembly 1 and a lens assembly 2. In addition, the camera module 10 may further include an adhesive part 3.

The substrate assembly 1 may have a structure in which an image sensor 12 is coupled to a PCB 11 on which a conductive wiring pattern is formed. The substrate assembly 1 may further include a first extension part 13 extending in a direction crossing a first optical axis Ax1 of the image sensor 12, and a first fixing part 15 provided on one side of the first extension part 13 and protruding from a surface of the first extension part 13.

The substrate assembly 1 may include a plurality of first extension parts 13 extending from the image sensor 12 to the outside, and may include three first extension parts 13 symmetrically disposed as shown in the drawing. However, the present disclosure is not limited thereto, and the first extension part 13 may have any structure capable of stably fixing the substrate assembly 1 and the lens assembly 2.

The first fixing part 15 may be provided at one side of the first extension part 13, may protrude from a surface of the first extension part 13, and may protrude in a measurement direction of the image sensor 12. The first fixing part 15 may be integrally formed through an injection molding process when the PCB substrate 11 is manufactured.

The lens assembly 2 may include an actuator 22 and a lens 21 received therein, and the actuator 22 may include an electrode pin (not shown) electrically connected to at least the PCB substrate 11 and/or the image sensor 12. The actuator 22 may include an actuator for autofocus and/or an actuator for camera shake correction, and the actuator for auto focus actuator and the actuator for camera shake correction may be integrally provided.

The lens assembly 2 may further include a second extension part 23 formed to correspond to the first extension part 13 of the substrate assembly 1 and having a second hole 25 formed at one side thereof to receive the first fixing part 15. For example, when three first extension parts 13 are provided, three second extension parts 23 may also be provided, and the shapes of the second extension part 23 may be the same as those of the first extension part 13. The second hole 25 may be formed as a through hole for receiving the first fixing part 15. The lens assembly 2 may be temporarily fixed to the substrate assembly 1 by coupling the second hole 25 to the first fixing part 15.

The adhesive part 3 may connect the first fixing part 15 and the second hole 25 to fix the lens assembly 2 to the substrate assembly 1. The adhesive part 3 may include an inorganic material, and as an embodiment, may include solder. The adhesive part 3 may include one or more metal materials selected from lead, lead-free, tin(Sn), silver(Ag), copper(Cu), a lead(Pb)-tin(Sn) mixture, a silver(Ag)-tin(Sn) mixture, and a copper(Cu)-tin(Sn) mixture. The number of the adhesive parts 3 corresponds to the number of each of the first extension parts 13 and the second extension parts 23, thereby stably fixing the lens assembly 2 to the substrate assembly 1.

Figure 3:
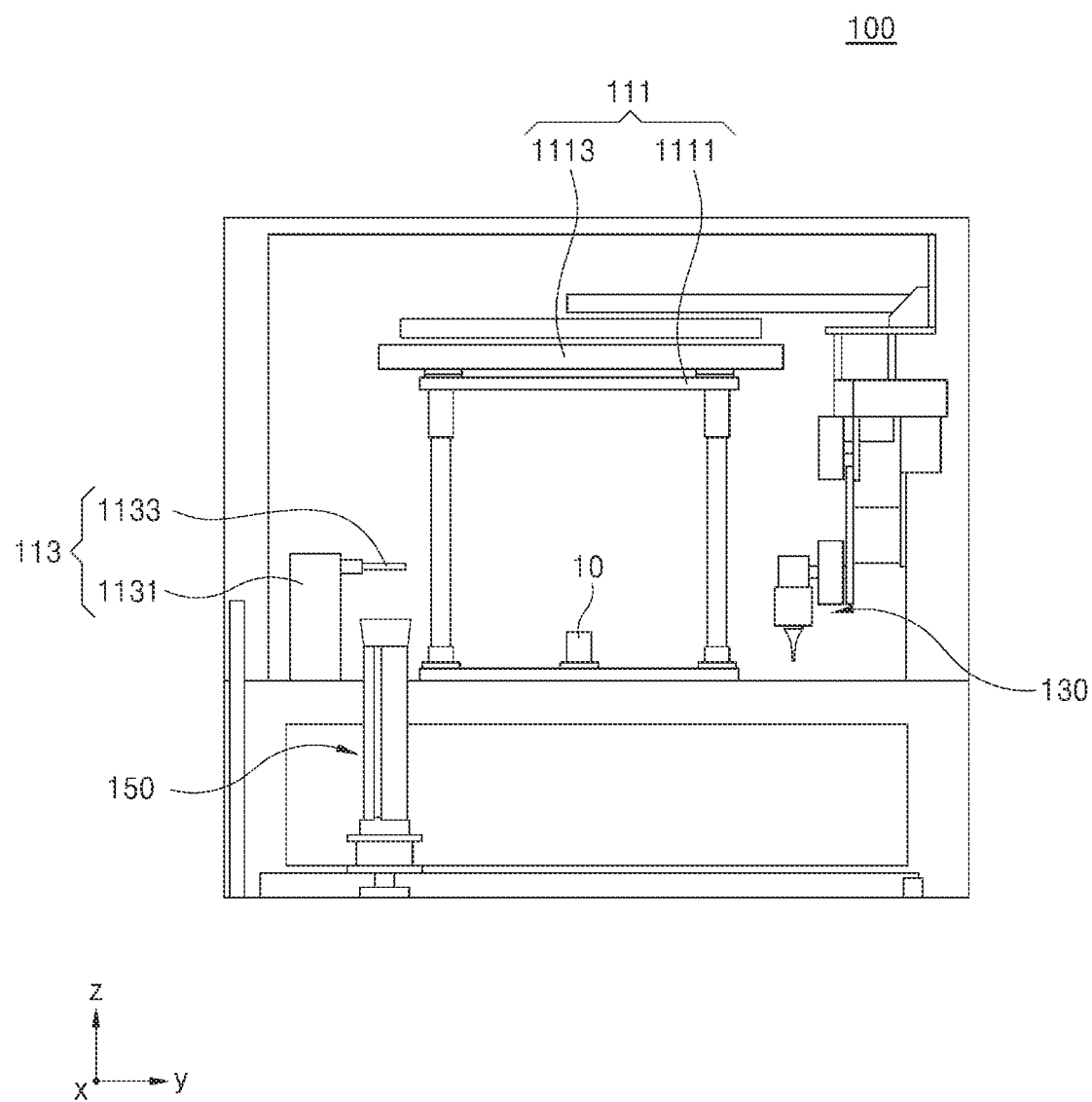
FIG. 3 is a conceptual view schematically showing a configuration of an example of a camera module manufacturing apparatus for assembling a camera module illustrated in FIG. 1.
Figure 4:
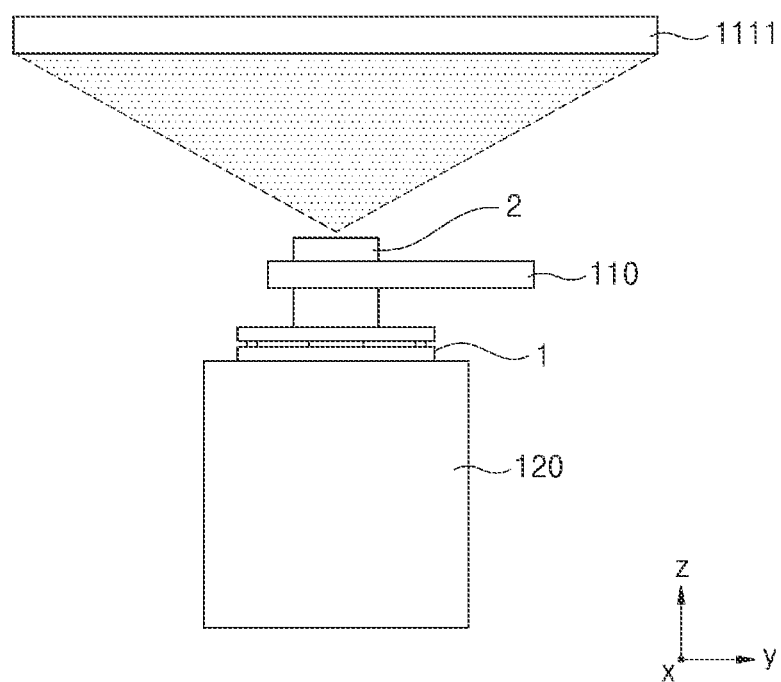
FIG. 4 is a conceptual view illustrating a portion of the configuration of the camera module manufacturing apparatus of FIG. 3.

FIG. 3 is a conceptual view schematically illustrating a configuration of a camera module manufacturing apparatus 100 for assembling the camera module 10 illustrated in FIG. 1 according to an exemplary embodiment, FIG. 4 is a conceptual view illustrating a portion of the camera module manufacturing apparatus 100 of FIG. 3 according to an exemplary embodiment, and FIG. 5 is a view sequentially illustrating a method of manufacturing a camera module by using the camera module manufacturing apparatus 100 of FIG. 3.

Referring to FIGS. 3 to 5, the camera module manufacturing apparatus 100 according to an embodiment of the present disclosure may include a chart unit 111, a substrate alignment unit 120, an optical axis alignment unit 110, and a camera module fixing unit 130.

The chart unit 111 may provide an image for optical axis alignment to the substrate assembly 1 including the image sensor 12. The chart unit 111 may include at least a light source 1113 and an inspection chart 1111, and thus may allow the lens of the lens assembly 2 and the optical axis of the image sensor 12 to be aligned with respect to each other. That is, the image sensor 12 senses an image of the inspection chart passing through the lens in a state in which the light source 1113, the inspection chart 1111, the lens, and the image sensor are sequentially aligned from the top of the drawing, to determine whether the optical axis of the lens is aligned with the optical axis of the image sensor 12.

The light source 1113 may irradiate light downward, that is, toward the camera module, as shown in FIG. 3, and the inspection chart 1111 may be disposed on a light path of the light. The inspection chart 1111 may be a light-transmissive film on which an inspection pattern for inspecting the camera module 10 is formed. In an embodiment, an inspection pattern for evaluating the degree of resolution of the camera module 10 may be formed. The inspection chart 1111 may be coupled to the light source 1113 by a separate fixing device. However, the present disclosure is not limited thereto, and the light source 1113 and the inspection chart 1111 may be integrally formed. For example, the inspection pattern may be printed on a surface of the light source 1113.

The substrate alignment unit 120 may be disposed to face the chart unit 111, may align the substrate assembly 1, and may be electrically connected to the image sensor 12. The substrate alignment unit 120 may include a mounting portion (not shown) on which the substrate assembly 1 is mounted. The mounting portion may be provided such that the substrate assembly 1 is mounted on an upper surface thereof, and may include a terminal portion (not shown) to be in contact with the substrate assembly 1 mounted thereon and electrically connected to the image sensor 12. In this case, the terminal portion (not shown) may be electrically connected to a power source and a control unit (not shown) to transmit an image obtained through the image sensor 12 to the control unit (not shown).

In addition, although not shown, the mounting portion may include a driving unit for X-axis movement (x), Y-axis movement (y), Z-axis movement (z), R-axis rotation (R), and tilting (yawing Tx, Pitching Ty) so as to align the position of the substrate assembly 1 mounted on the upper surface thereof. The mounting portion may perform a function of finely aligning the position of the substrate assembly 1 by the driving unit.

The optical axis alignment unit 110 may align the lens assembly 2 including the lens and the actuator with respect to the image sensor 12. In other words, the optical axis alignment unit 110 may optically align an second optical axis Ax2 of the lens of the lens assembly 2 with respect to a first optical axis Ax1 (see FIG. 2) of the image sensor 12 of the substrate assembly 1, and then, the lens assembly 2 is coupled to the substrate assembly 1 to thereby form a camera module.

The optical axis alignment unit 110 may further include a gripping unit 113 configured to grip the lens assembly 2 so as to enable the alignment of the second optical axis Ax2 with respect to the first optical axis Ax1. The gripping unit 113 may be electrically connected to a control unit (not shown) in which the obtained image of the camera module 10 is previously stored. The control unit may inspect the optical axis of the camera module 10 using the stored image, and may control the gripping unit 113 to align the second optical axis Ax2 of the lens of the lens assembly 2 to be in correspondence with the first optical axis Ax1 of the image sensor 12.

For example, the control unit may align the lens assembly 2 with respect to the substrate assembly 1 by controlling the gripping unit 113 in such a way that the second optical axis Ax2 coincides with the first optical axis Ax1. The gripping unit 113 may include a first guide 1131 extending in at least one of the x-direction and the y-direction, and a gripper 1133 which grips the lens assembly 2 while reciprocating along the first guide 1131 or reciprocating in the z-direction.

The driving of the gripping unit 113 may correspond to the driving of the substrate alignment unit 120. For example, when the substrate alignment unit 120 is driven in five axes by the X-axis movement (x), the Y-axis movement (y), the R-axis rotation (R), and the tilting (Tx, Ty), the gripping unit 113 may be driven in the Z-axis movement (z). In an embodiment, when the substrate alignment unit 120 is driven in four axes by the X-axis movement (x), the Y-axis movement (y), the Z-axis movement (z), and the R-axis rotation (R), the gripping unit 113 may be driven in the tilting (Tx, Ty) manner. In other words, the driving operations of the substrate alignment unit 120 and the gripping unit 113 may be complementarily performed.

The camera module fixing unit 130 may be positioned adjacent to the optical axis alignment unit 110. The camera module fixing unit 130 may fix the lens assembly 2 on the substrate assembly 1 by applying an instantaneous curing adhesive, which is an inorganic material, to the lens assembly 2 and the substrate assembly 1 which are aligned with respect to each other by the optical axis alignment unit 110. In this case, the instantaneous curing adhesive may include an inorganic material, for example, solder. The camera module fixing unit 130 may be a soldering unit.

Although not shown, the camera module fixing unit 130 may include a second guide extending in the x-direction and the y-direction, and an adhesive application unit (not shown) which applies an instantaneous curing adhesive between the lens assembly 2 and the substrate assembly 1 while reciprocating along the second guide or reciprocating in the z-direction.

The adhesive application unit may include an adhesive supply unit for supplying an adhesive and a heating unit for applying heat to the adhesive supplied from the adhesive supply unit. The adhesive supply unit and the heating unit may move together while being coupled to each other, and may supply an adhesive between the lens assembly 2 and the substrate assembly 1 and simultaneously apply heat so as to fix the lens assembly 2, of which optical axis is aligned, on the substrate assembly 1. The adhesive supply unit may supply an adhesive including at least one metal material selected from lead, lead-free lead, tin (Sn), silver (Ag), copper (Cu), a lead (Pb)-tin (Sn) mixture, a silver (Ag)-tin (Sn) mixture, a copper (Cu)-tin (Sn) mixture, in the form of solder, cream solder, and solder ball. The heating unit may include an iron or a laser, capable of supplying heat to the adhesive. However, the types of the adhesive supply unit and the heating unit are not limited to the above-described types, and various types of soldering methods using an instantaneous curing adhesive can be applicable to the adhesive application unit.

The camera module fixing unit 130 may fix the lens assembly 2 on the substrate assembly 1 by applying an instantaneous curing adhesive between the second hole 25 (see FIG. 2) of the lens assembly 2 and the first fixing part 15 of the substrate assembly 1. According to an embodiment, the camera module fixing unit 130 may apply an instantaneous curing adhesive S in a direction from the lens assembly 2 to the substrate assembly 1.

Figure 5C:
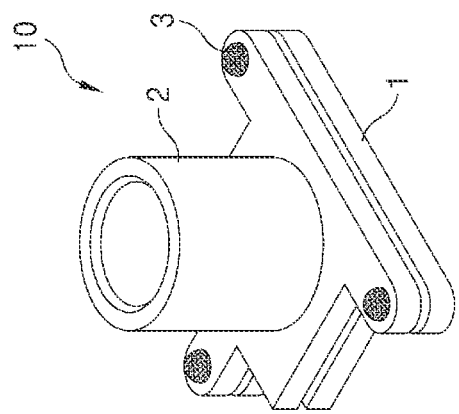
FIG. 5A-C is a view sequentially illustrating a method of manufacturing a camera module by using the camera module manufacturing apparatus of FIG. 3.
Figure 5B:
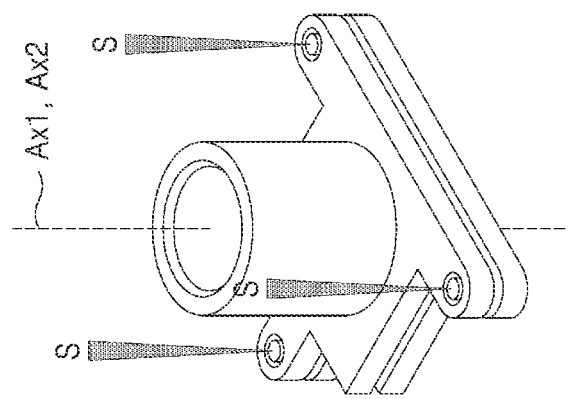
Figure 5A:
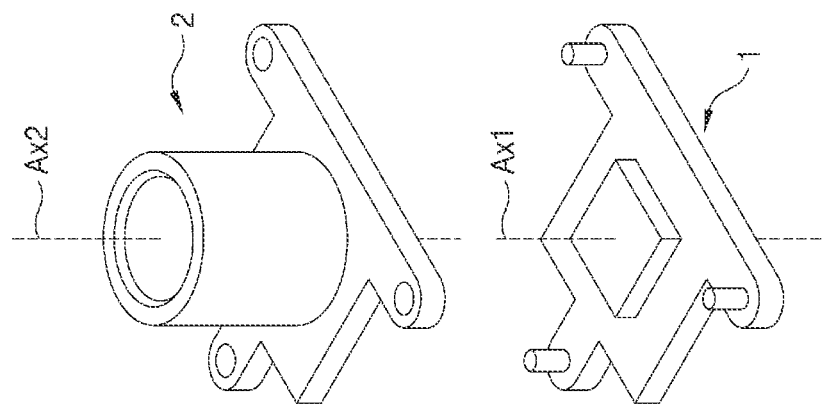

As illustrated in FIG. 5, the lens assembly 2 of which the optical axes Ax1 and Ax2 are aligned by the optical axis alignment unit 110, may be preliminarily fixed on the substrate assembly 1 by coupling the second hole 25 and the first fixing part 15 (see FIG. 5A). The camera module fixing unit 130 may apply the instantaneous curing adhesive S to the second hole 25 so as to fix the second hole 25 and the first fixing part 15 received by the second hole 25 (see FIG. 5B). Accordingly, the lens assembly 2 is fixed, by the adhesive part 3 formed by the instantaneous curing adhesive S, on the substrate assembly 1 in a state in which the optical axis thereof is aligned, thereby completing the camera module 10 (see FIG. 5C).

In an embodiment, a transfer unit 150 may be further included. The transfer unit 150 may transfer elements such as the lens assembly 2 and the substrate assembly 1, or transfer the manufactured camera module 10.

Camera module manufacturing apparatuses according to embodiments of the present disclosure can minimize the optical axis distortion of a camera module by using an instantaneous curing adhesive, that is, an adhesive including a solder, which provides a fixing force instantly. In addition, in the case of camera module manufacturing apparatuses according to embodiments of the present disclosure can apply an instantaneous curing adhesive in a direction from a lens assembly to a substrate assembly, thereby enabling a chart unit to be provided above the camera module. Accordingly, the camera module manufacturing apparatuses according to embodiments of the present disclosure can be directly applied without changing the structure of existing equipment.

In camera module manufacturing apparatuses according to embodiments of the present disclosure, the optical axis distortion of a camera module can be minimized by using an instantaneous curing adhesive, that is, an adhesive including solder, which provides a fixing force instantly. In addition, in the case of camera module manufacturing apparatuses according to embodiments of the present disclosure can apply an instantaneous curing adhesive in a direction from a lens assembly to a substrate assembly, thereby enabling a chart unit to be provided above the camera module. Accordingly, the camera module manufacturing apparatuses according to embodiments of the present disclosure can be directly applied without changing the structure of existing equipment.

Hereinbefore, the present disclosure has been described based on embodiments. Those of ordinary skill in the art to which the present disclosure pertains will understand that the present disclosure may be implemented in a modified form without departing from the essential characteristics of the present disclosure. Therefore, the disclosed embodiments should be considered from an illustrative point of view rather than a limiting point of view. The scope of the present disclosure is shown in the claims rather than the above description, and all differences within the scope should be construed as being included in the disclosure.

What is claimed is:

1. A camera module manufacturing apparatus comprising:
   a chart unit configured to provide an image for optical-axis alignment to a substrate assembly including an image sensor;
   a substrate alignment unit disposed opposite to the chart unit, aligning the substrate assembly, and electrically connected to the image sensor;
   an optical axis alignment unit configured to allow an optical axis of a lens assembly including a lens and an actuator to be aligned with respect to an optical axis of the image sensor; and
   a camera module fixing unit positioned adjacent to the optical axis alignment unit, and fixing the lens assembly on the substrate assembly by applying an instantaneous curing adhesive, which is an inorganic material, to the lens assembly and the substrate assembly which are aligned,
   wherein the substrate assembly further includes a first extension part extending in a direction crossing the optical axis, and a first fixing part provided on one side of the first extension part and protruding from a surface of the first extension part,
   the lens assembly further includes a second extension part formed corresponding to the first extension part and having a second hole formed to receive the first fixing part at one side thereof, and the second hole passes through the second extension part, and
   the camera module fixing unit applies the instantaneous curing adhesive between the second hole of the lens assembly and the first fixing part of the substrate assembly in a state in which the second hole receives the first fixing part, to fix the lens assembly on the substrate assembly.

2. The camera module manufacturing apparatus of claim 1, wherein
   the camera module fixing unit applies the instantaneous curing adhesive in a direction from the lens assembly to the substrate assembly so as to fix the lens assembly on the substrate assembly.

3. The camera module manufacturing apparatus of claim 1, wherein
   the adhesive includes solder.

4. A camera module comprising:
   a substrate assembly including an image sensor, a first extension part extending in a direction crossing an optical axis of the image sensor, and a first fixing part provided on one side of the first extension part and protruding from a surface of the first extension part;
   a lens assembly including a lens and an actuator, formed to correspond to the first extension part, and having a second extension part formed on one side thereof and having a second hole for receiving the first fixing part; and
   an instantaneous curing adhesive which is applied between the second hole of the lens assembly and the first fixing part of the substrate assembly in a state in which the second hole receives the first fixing part, so as to fix the lens assembly on the substrate assembly,
   wherein the second hole of the lens assembly passes through the second extension part.

5. The camera module of claim 4, wherein
   the instantaneous curing adhesive is applied in a direction from the lens assembly to the substrate assembly to fix the lens assembly on the substrate assembly.

6. The camera module of claim 4, wherein
   the instantaneous curing adhesive includes solder.

* * * * *